US 6,725,368 B1

United States Patent
Liebenow

(10) Patent No.: US 6,725,368 B1
(45) Date of Patent: Apr. 20, 2004

(54) SYSTEM FOR EXECUTING A POST HAVING PRIMARY AND SECONDARY SUBSETS, WHEREIN THE SECONDARY SUBSET IS EXECUTED SUBSEQUENTLY TO THE PRIMARY SUBSET IN THE BACKGROUND SETTING

(75) Inventor: Frank W. Liebenow, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/458,247

(22) Filed: Dec. 9, 1999

(51) Int. Cl.[7] .................. G06F 9/445; G06F 15/177
(52) U.S. Cl. .......................................... 713/2
(58) Field of Search ................. 713/1, 2, 100; 714/36, 48

(56) References Cited

U.S. PATENT DOCUMENTS

| | | | | |
|---|---|---|---|---|
| 4,980,820 A | * | 12/1990 | Youngblood | 710/6 |
| 5,426,775 A | * | 6/1995 | Boccon-Gibod | 714/36 |
| 5,432,927 A | | 7/1995 | Grote et al. | 395/575 |
| 5,465,357 A | * | 11/1995 | Bealkowski et al. | 713/2 |
| 5,581,693 A | | 12/1996 | Pecone | 395/183.01 |
| 5,860,001 A | | 1/1999 | Cromer et al. | 395/651 |
| 5,978,913 A | * | 11/1999 | Broyles et al. | 713/2 |
| 6,434,696 B1 | * | 8/2002 | Kang | 713/2 |

FOREIGN PATENT DOCUMENTS

DE        4315732 C1  *  6/1994  ........... G06F/12/14

OTHER PUBLICATIONS

WebSurfer—"SE440BX Freezes on Boot–up"—Dec. 6, 1998—Newsgroups: intel.motherboards.pentium_II.*
"BIOS Boot Specification", *Compaq Computer Corporation, Phoenix Technologies, Ltd., Intel Corporation*, Version 1.01, 1–45, (Jan. 11, 1996).
"Phoenix BIOS and the Year 2000", *Phoenix Technologies, Ltd.*, 1–8, (Oct. 23, 1998).
"POST Memory Manager Specification", *Phoenix Technologies, Ltd.*, Version 1.01, 1–17, (Nov. 21, 1997).
"Simple Boot Flag Specification", http//www.microsoft.com/hwdev/desinit/simp_bios.htm, Version 1.0, 1–7, (Jun. 15, 1999).

* cited by examiner

*Primary Examiner*—Dennis M. Butler
*Assistant Examiner*—Thuan Du
(74) *Attorney, Agent, or Firm*—Scott Charles Richardson; Jeffrey A. Proehl; Leonary-Proehl

(57) ABSTRACT

A method and apparatus for executing a power on self test includes executing a primary subset of POST tests during initial startup of a computer, and executing a secondary subset of non-essential POST tests transparent to a user at a later time. The secondary subset of POST tests may be performed after a period of computer inactivity.

31 Claims, 4 Drawing Sheets

SYSTEM FOR EXECUTING A POST HAVING PRIMARY AND SECONDARY SUBSETS, WHEREIN THE SECONDARY SUBSET IS EXECUTED SUBSEQUENTLY TO THE PRIMARY SUBSET IN THE BACKGROUND SETTING

FIELD

The present invention relates generally to power on self testing of computers, and more specifically to methods for performing power on self testing.

BACKGROUND

On startup from a fully shut down state, computers move through a series of startup procedures to check the integrity of certain system components and the system itself. Such tests are initiated from a number of sources. Initial startup testing is performed from instructions stored in a basic input/output system (BIOS). The computer BIOS is built-in software that is run initially on startup of the computer. The BIOS contains all the code required to control the peripheral devices of the computer, such as keyboard, display screen, disk drives, serial communications, and the like.

The BIOS is typically stored on a read only memory (ROM) chip. Since it is stored on a dedicated chip, the BIOS is protected from many disk and memory failures. The BIOS allows the computer to boot itself. On startup, the BIOS is often copied into computer random access memory (RAM) because RAM operates faster than ROM.

The BIOS of a computer runs a certain number of tests on the system before passing control of computer functions to an operating system such as Microsoft Windows or the like. The diagnostic tests are referred to as the power on self test (POST). These tests take a certain amount of time to run, and may delay the startup of the computer system. Once these tests are complete, the BIOS will begin loading the operating system.

In general, the BIOS POST tests include tests and procedures for initializing system hardware, checking memory, initializing power management systems if necessary, enabling the keyboard, testing the serial, parallel, USB, and network ports, initializing floppy drives and hard disk drive controllers, and the like.

In order to allow a user of a computer to be able to get access to the computer quickly, a number of schemes for reducing the number of POST tests run are in use. These POST schemes to speed up boot of the computer eliminate certain POST tests from executing. The various POST tests have varying degrees of pertinence to the operation of a computer. For example, some tests should be performed every single time a computer boots up. Other tests may only need to be run every fifth time. Some components tested in the POST rarely if ever have problems, Such POST tests may only need to be run once a week.

However, all the POST tests should be run at some point. Schemes that skip certain tests because they are statistically low in the probability of failure nevertheless can run afoul of corrupted components, operating systems and the like, especially of the POST test is skipped for many boot cycles.

Some schemes eliminate many POST tests, then if one of the POST tests that does run indicates an error, a full set of POST tests is run at the next boot. This scheme fails to find problems that may be present in the areas the POST test does not examine. It only initiates a full POST test if one of the selected POST tests which is run indicates a problem. In this scheme, when a problem occurs with a component or system which would be detected by a POST test which is bypassed occurs, no full POST testing will occur unless one of the normally run POST tests has an error. While many POST errors for non-essential tests may not be serious, when an error goes undetected and uncorrected for a period of time, it may compound and lead to other errors, all of which would be preventable by simply running all the tests.

Therefore, there is a need in the art for a way to ensure system integrity while still allowing faster boot times for a computer.

SUMMARY

The present invention overcomes the problems of known systems by providing a POST testing process which bypasses non-essential POST tests on initial system startup, but performs the remaining tests after the user has gotten started with use of the computer. The remaining tests are run transparently to the user, in down time, after a period of inactivity, or in the computing background.

In one embodiment, a method for executing a power on self test includes selecting a primary subset of POST tests to execute during initial POST, selecting a secondary subset of POST tests to run after initial POST, executing the primary subset of POST tests during initial POST, and executing the secondary POST tests in a background setting.

In another embodiment, a method for executing a power on self test includes executing a predetermined subset of a full set of POST tests, waiting for a predetermined period of inactivity of the computer, and executing the remaining POST tests after the predetermined period. Any remaining POST test errors are flagged with a persistent flag, added to the predetermined subset of POST tests, and executed as part of the new subset upon a next computer startup.

A computer BIOS is hard coded with instructions for performing the methods in one embodiment.

Other embodiments are described and claimed.

DESCRIPTION OF EMBODIMENTS

In the following detailed description of embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and logical, structural, electrical, and other changes may be made without departing from the scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
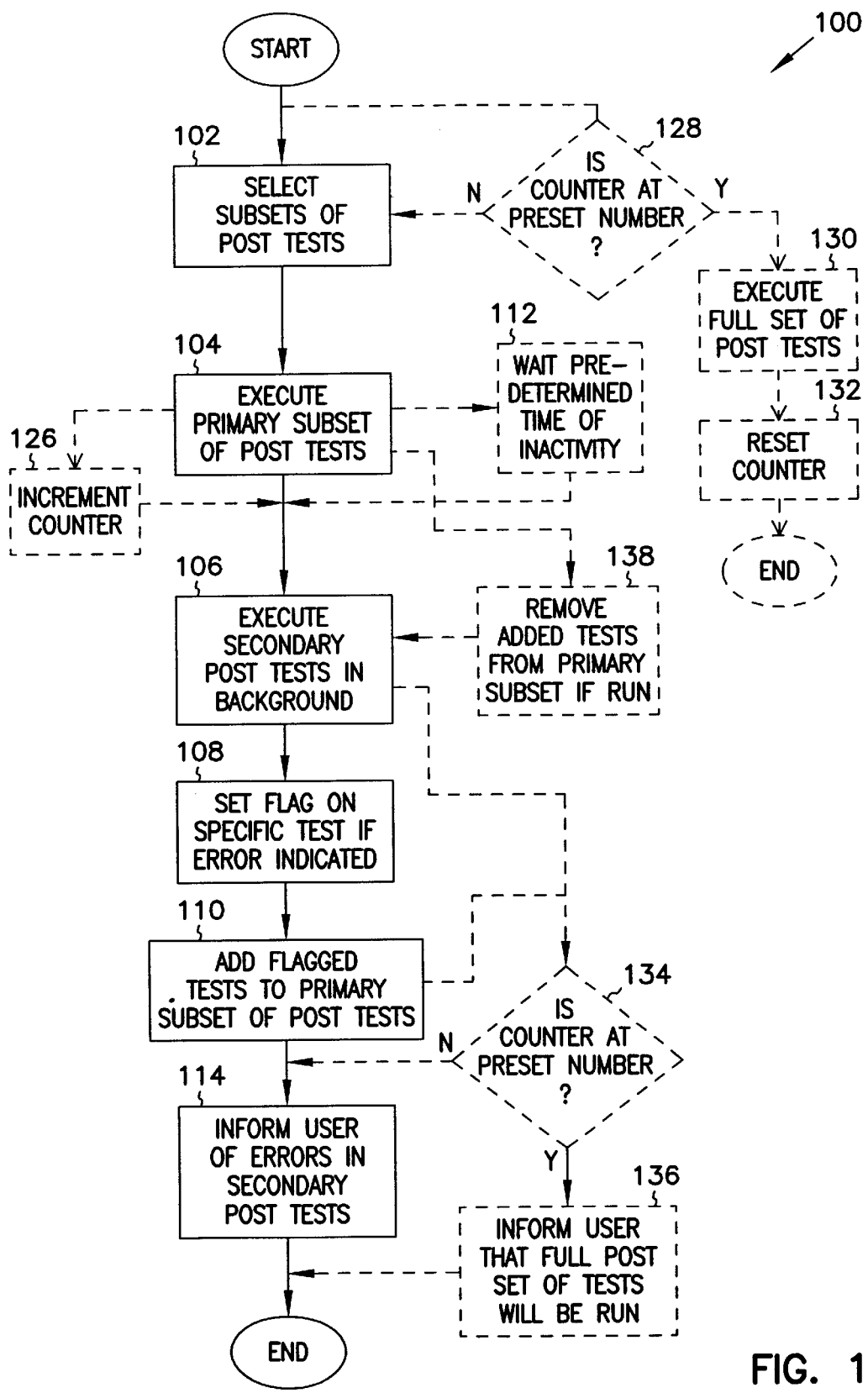
FIG. 1 is a flow chart diagram of a method embodiment of the present invention.

FIG. 1 shows an embodiment 100 of a method for running a set of POST tests on a computer. Method 100 comprises selecting a primary subset of the full set of POST tests to be run during initial startup of a computer and a secondary subset of POST tests to be run after initial POST in block 102, executing the selected primary subset of POST tests in block 104, and executing the secondary POST tests transparent to a user at a later time in block 106. The POST tests which are part of the subsets of tests to be run may be determined in any number of ways. In one embodiment, the tests to be performed are determined in advance for a specific POST sequence, and are BIOS dependent. For sophisticated users, in another embodiment, the user could select the tests to be part of the primary or secondary subset of tests to be performed.

Process flow of method 100 continues with block 108, in which a flag is set for any tests performed in block 106 which found errors. In block 110, any tests flagged in block 108 are added to the primary subset of POST tests for execution at the next startup cycle of the computer.

In another embodiment, for any test performed in block 106 for which an error flag is not set in block 108, such error-free test is removed from the primary subset of POST tests scheduled for execution at the next and subsequent startup cycles of the computer.

In another embodiment, after execution of the primary subset of POST tests in block 104, a predetermined time period is waited in block 112 before execution of the secondary POST tests. The predetermined time period is in one embodiment timed from the last activity of the computer. Once the computer has been inactive for the predetermined time period, the secondary tests of the POST tests run. Inactivity of the computer may be measured in a number of ways, including by way of example only and not by way of limitation keyboard inactivity, pointing device inactivity, system inactivity, or the like. In another embodiment, the predetermined time period is simply a set time after completion of the primary subset of POST tests.

Figure 1A:
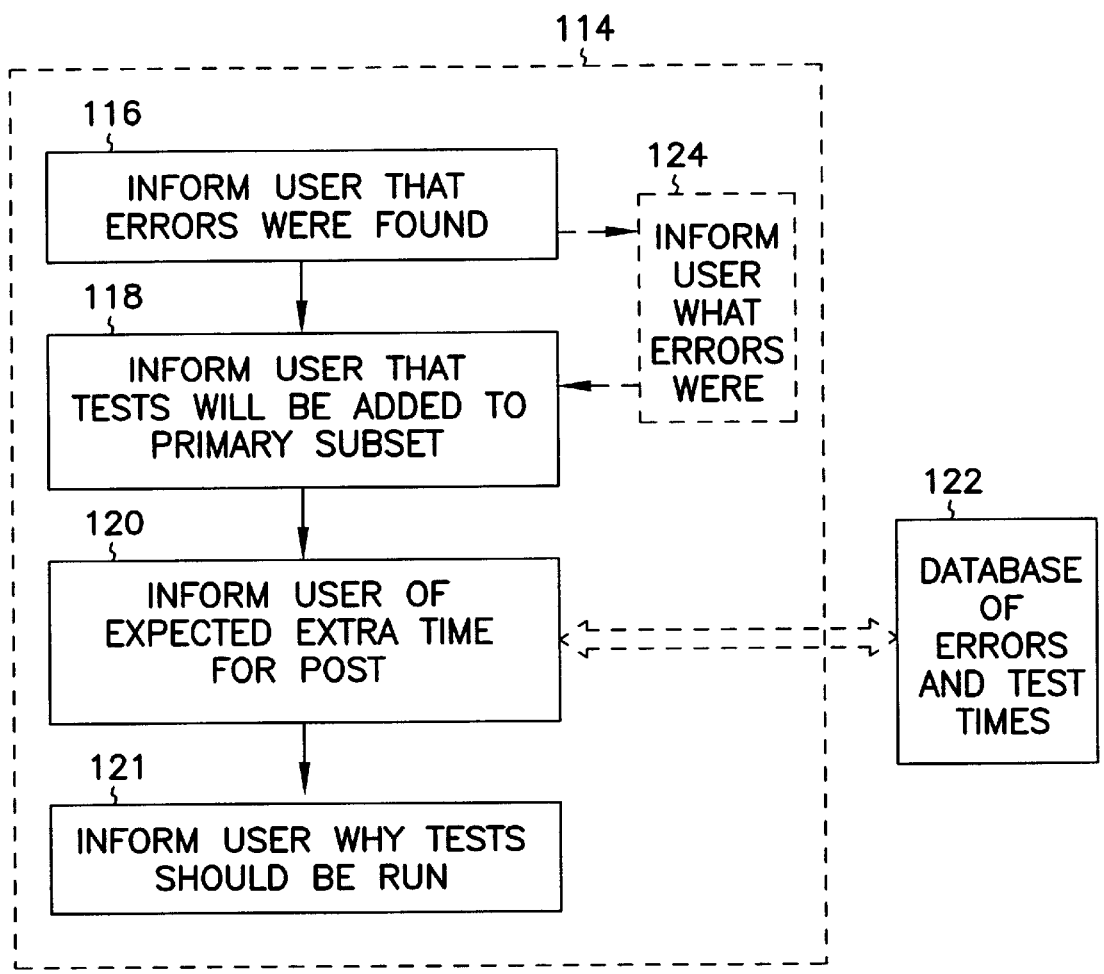
FIG. 1A is a flow chart diagram of another method embodiment of the present invention.

In further process flow of method 100, the user is informed about errors in the secondary POST tests in block 114. Block 114 of method 100 is shown in greater detail in FIG. 1A. When informing the user of the test about errors found in the secondary POST tests in block 114, the user is in one embodiment informed that errors were found in block 116, that the POST tests with errors will be added to the primary subset for execution at the next startup in block 118, how much expected extra time the primary POST test subset will require to execute the added test or tests in block 120, and why the tests should be run in block 121.

In one embodiment, the method 100 determines the expected extra time by consulting a database of errors and POST test times 122. In an optional process flow of method 100, the user is informed of the nature of the errors in block 124. In one embodiment, the user is informed when the error is noted. In another embodiment the user is notified upon completion of the secondary POST tests. It should be understood that the user may be notified at different times and in different manners without departing from the scope of the invention.

In another branch of optional process flow of method 100, each time the primary subset of POST tests is run, a counter is incremented by one in block 126. In the counter embodiment, upon startup of the computer, a decision is made in decision block 128 as to whether the counter has reached a predetermined number of cycles without running a full set of POST tests. If the counter has reached the preset number, then a full set of POST tests is run in block 130, and the counter is reset in block 132.

In yet another optional branch of method 100, if a counter is being used, then after executing the secondary tests in block 106 or after adding the flagged tests in block 110, a decision is made as to whether the counter has reached the predetermined number of cycles without a full set of POST tests being run in block 134. If the predetermined number has been reached, then the user is informed in block 136 that a full set of POST tests will be run at the next computer startup.

Figure 1B:
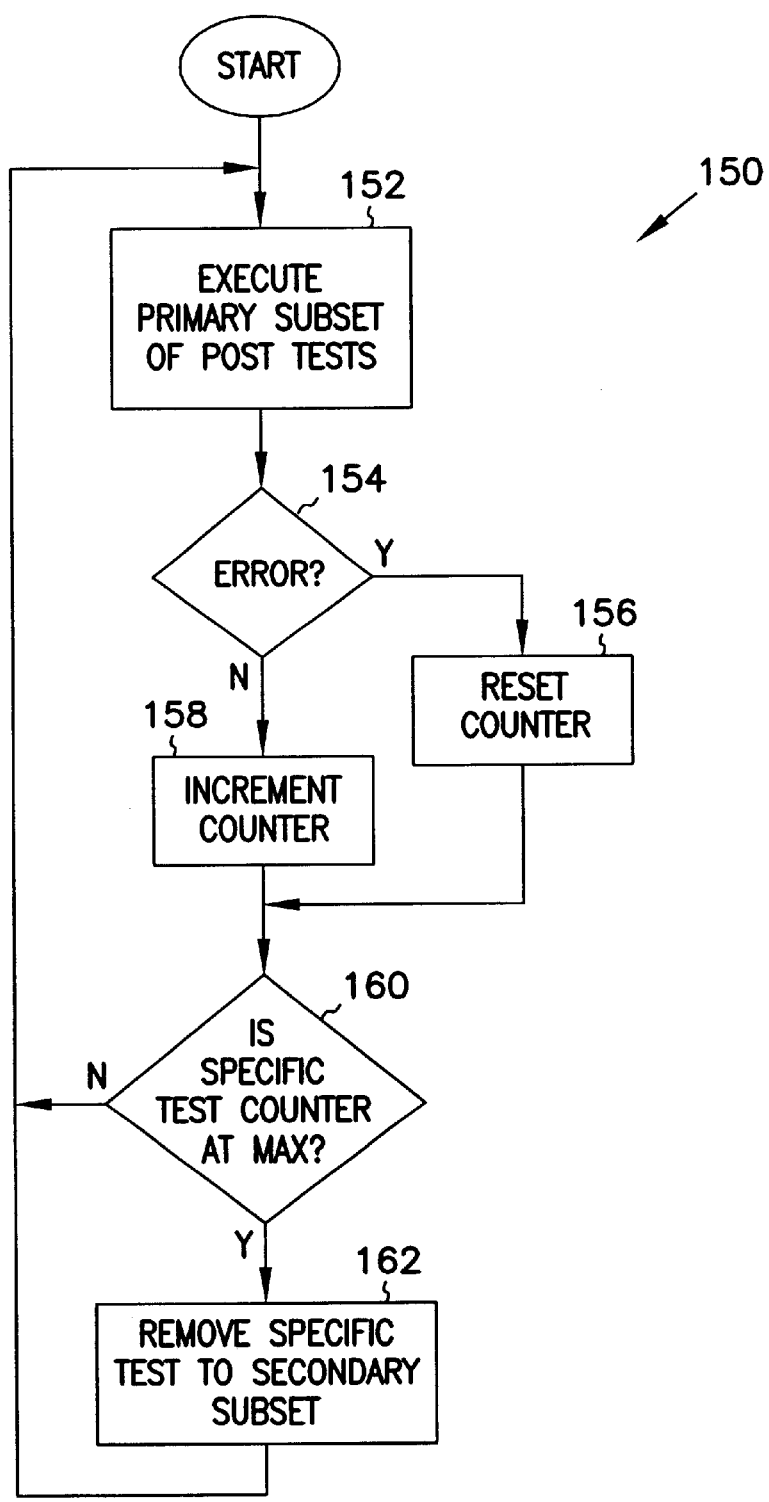
FIG. 1B is a flow chart diagram of another method embodiment of the present invention.

In another embodiment 150 shown in FIG. 1B, a counter is incremented for each time a particular POST test is run. Upon detecting an error, this counter is reset. After the counter reaches a predetermined number of error-free cycles, the corresponding POST test is removed from the primary subset of POST tests scheduled for execution at the next and subsequent startup cycles of the computer to the secondary subset of POST tests. In embodiment 150, primary and secondary subsets of POST tests are selected external to the method. The primary subset of tests is executed in block 152. For each test, it is determined whether an error has occurred in block 154. If an error has occurred, the counter for that test is reset in block 156. If no error has occurred, the counter is incremented by one in block 158. In decision block 160, the counter value for the specific test is compared with a predetermined maximum number of cycles for that test. If the counter has reached that maximum without error, the specific test is removed to the secondary set of POST tests in block 162. Process flow continues with block 152 until the complete primary set of tests has been run.

If during the execution of the secondary POST tests the user initiates computer activity, such as by using the keyboard or pointing device, or initiates system activity, then the remaining tests are in one embodiment suspended until a new time period of inactivity elapses. At that time, the secondary POST tests are executed.

In yet another embodiment, the flags set in block 108 are persistent flags, so that if a user interrupts the execution of the secondary POST tests, or if the system is shut down or loses power before the tests have been run, or if the user attempts to bypass the running of the remaining or added tests, or the like, the flags remain. The flags remain until the extra tests have been run. Once the added tests have been run, they are removed from the subset in block 138.

As has been mentioned, execution of many different POST tests may be delayed until after the computer system has gone through a startup. For example, most POST schemes include memory testing, disk spin up time, diagnostics for hardware and firmware, option ROM, floppy and hard drive tests, and device configuration tests. Further, sub-categories of the tests include BIOS Aware IPL (Initial Program Load) Device (BAID) tests, Plug-and-Play (PNP) tests, and IPL and Boot Connection Vector (BCV) tests. Given the reliability of modem hardware and memory structures, many of the hardware tests can be bypassed and not included in the primary subset of POST tests. In other words, in one embodiment, full hardware integrity is assumed until after the operating system is loaded and operational.

It should be understood that the number of cycles between execution of a full set of POST tests may be chosen to suit the needs of the user. For systems which must be as robust as possible, all POST tests may be run every boot cycle. For other systems, a full set of POST tests may be run only once every ten or more boot cycles. Such variation is within the scope of the invention.

Figure 2:
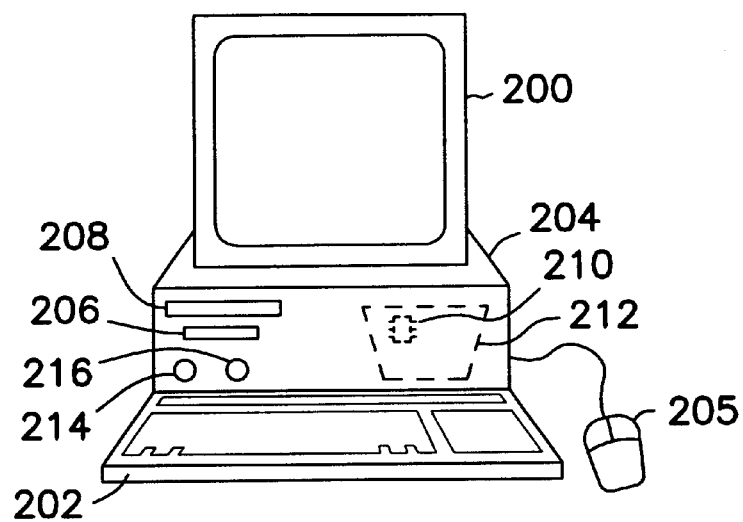
FIG. 2 is a perspective view of a computer on which embodiments of the present invention are utilized.

In one embodiment, the method 100 is embodied in hard programmed code in a BIOS chip such as BIOS chip 210 shown on motherboard 212 in FIG. 2. In other embodiments, the method is contained in a software program module loaded into a computer BIOS.

Desktop computers, as shown in FIG. 2, typically include a monitor 200, keyboard input 202, central processing unit 204, and a pointing or selection device such as mouse 205. Further components of a typical computer system may include a machine readable storage media such as floppy disk drive 206, hard disk, CD-ROM 208, DVD, modem, and the like. The processor unit of such a computer typically includes a microprocessor, memory (RAM and ROM), and other peripheral circuitry, not shown. In another embodiment, a computer system such as the system shown in FIG. 2 has two different power up buttons 214 and 216. One of the power up buttons will initiate a full boot with the full set of POST tests. The other button will initiate a boot with the current subset of POST tests.

Figure 3:
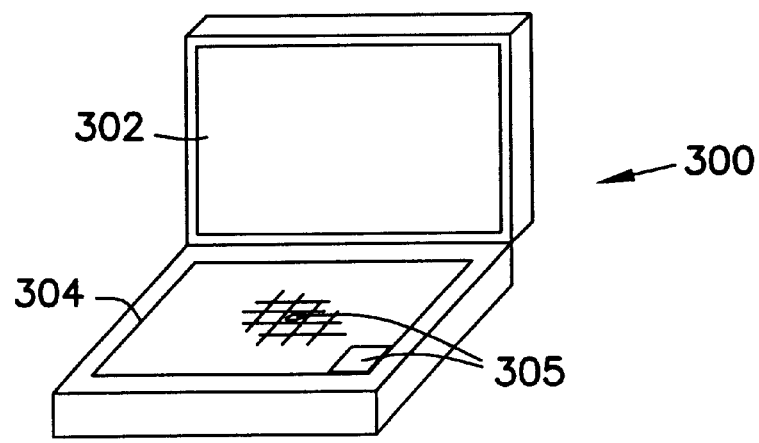
FIG. 3 is a perspective view of another computer on which embodiments of the present invention are utilized.

Portable or laptop computers, as shown in FIG. 3 include the same features in general as desktop computers, but are smaller, and often comprise a single unit 300 with integrated display screen 302 and keyboard 304, and pointing device 305 such as a touch pad or trackball. Such computers are some of the types of host devices on which embodiments of the present invention may be employed.

Method 100 and apparatus 210 in one embodiment comprise computer programs written to perform power on self testing on personal computers as shown in FIG. 2 or 3. The computer programs run on the BIOS as described above or central processing unit 204 out of main memory, and may be transferred to main memory from permanent storage via disk drive 206 when stored on removable media or via a network connection or modem connection when stored outside of the personal computer, or via other types of computer or machine readable medium from which it can be read and utilized. The computer programs comprise multiple modules or objects to perform the method 100, or the functions of the modules in apparatus 210. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the fill scope of equivalents thereof.

What is claimed is:

1. A method of executing a power on self test (POST), comprising:

selecting a primary subset of POST tests to execute during initial POST;

selecting a secondary subset of POST tests to execute after initial POST;

executing the primary subset of POST tests during initial POST; and executing the secondary subset of POST tests in a background setting.

2. The method of claim 1, and further comprising:

waiting for a predetermined period of inactivity before executing the secondary subset of POST tests.

3. The method of claim 2, and further comprising:

suspending the remaining tests if activity of the computer resumes.

4. The method of claim 3, and further comprising:

resuming the remaining tests after waiting another predetermined period of inactivity of the computer.

5. The method of claim 1, and further comprising:

setting a flag to identify any of the secondary subset of POST tests which indicate problems.

6. The method of claim 5, and further comprising:

adding any flagged test to the primary subset of POST tests.

7. The method of claim 6, and further comprising:

informing a user of additional tests to be performed at the next power up.

8. The method of claim 7, and further comprising:

informing the user how much extra time the added tests will take.

9. The method of claim 7, and further comprising:

informing the user why the extra tests should be performed.

10. The method of claim 5, and further comprising:

removing any non-flagged test to the secondary subset of POST tests.

11. The method of claim 1, and further comprising:

informing a user of additions to the primary subset.

12. The method of claim 1, and further comprising:

incrementing a counter upon completion of the primary subset of POST tests.

13. The method of claim 12, and further comprising:
running a full set of POST tests when the counter reaches a predetermined number.

14. The method of claim 13, and further comprising:
informing the user that a full set of POST tests will be run at the next startup when the counter reaches the predetermined number.

15. The method of claim 13, and further comprising:
resetting the counter after a full set of POST tests is run.

16. The method of claim 1, wherein the method is encoded in the computer BIOS.

17. The method of claim 1, wherein executing the primary subset of POST tests comprises:
checking for an error in each test of the primary subset of tests;
incrementing a test error counter if no error occurs;
resetting the test error counter if an error occurs;
determining if the test error counter has reached a predetermined maximum; and
removing the test to the secondary subset if the test error counter has reached the predetermined maximum.

18. A method for executing a power on self test (POST), comprising:
executing a primary subset of a full set of POST tests;
waiting for a predetermined period of inactivity;
executing a secondary subset of POST tests;
flagging any test error in the secondary subset of POST tests with a persistent flag;
adding any of the secondary subset of POST tests with errors to the primary subset of POST tests; and
executing the new primary subset upon a next computer start up.

19. The method of claim 18, and further comprising:
informing a user of additional tests to be performed at the next computer startup.

20. The method of claim 18, and further comprising:
incrementing a counter upon completion of the primary subset of POST tests.

21. The method of claim 20, and further comprising:
running a full set of POST tests when the counter reaches a predetermined number.

22. The method of claim 21, and further comprising:
resetting the counter after a full set of POST tests is run.

23. The method of claim 20, and further comprising:
informing the user how much extra time the added tests are expected to take.

24. The method of claim 20, and further comprising:
setting a flag if one or more of the secondary subset tests indicates a problem; and
incrementing a counter on unrun tests so that all POST tests will be run on a predetermined schedule.

25. A computer readable medium comprising computer instructions executable to cause a computer to perform a method comprising:
selecting a primary subset of POST tests to execute during initial POST;
selecting a secondary subset of POST tests to execute after initial POST;
executing the primary subset of POST tests during initial POST; and
executing the secondary subset of POST tests in a background setting.

26. The computer readable medium of claim 25, wherein the method is encoded in a computer BIOS.

27. A computer system, comprising:
a computer;
a BIOS chip having encoded thereon instructions for performing a POST test, comprising:
selecting a primary subset of POST tests to execute during initial POST;
selecting a secondary subset of POST tests to execute after initial POST;
executing the primary subset of POST tests during initial POST; and
executing the secondary subset of POST tests in a background setting.

28. The computer system of claim 27, wherein the instructions are hard coded.

29. The computer system of claim 27, wherein the instructions are in a software module.

30. The computer system of claim 27, wherein the computer has first and second power buttons, the first power button initiating a full POST test, and the second power button initiating an abbreviated POST test.

31. A BIOS chip having instructions coded thereon for performing a method comprising:
selecting a primary subset of POST tests to execute during initial POST;
selecting a secondary subset of POST tests to execute during initial POST;
executing the primary subset of POST tests during initial POST; and
executing the secondary subset of POST tests in a background setting.

* * * * *